(12) United States Patent
Sokei et al.

(10) Patent No.: US 7,395,247 B2
(45) Date of Patent: Jul. 1, 2008

(54) METHOD AND DEVICE FOR PROMOTING BOOK RECYCLING AND THEIR PROGRAM AND RECORDING MEDIUM

(75) Inventors: Satsuki Sokei, Kawasaki (JP); Hiroyuki Tamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 844 days.

(21) Appl. No.: 10/106,377

(22) Filed: Mar. 27, 2002

(65) Prior Publication Data

US 2003/0115097 A1 Jun. 19, 2003

(30) Foreign Application Priority Data

Dec. 18, 2001 (JP) ............................. 2001-383846

(51) Int. Cl.
*G06F 17/00* (2006.01)
(52) U.S. Cl. ..................................... 705/400
(58) Field of Classification Search ................. 705/400
See application file for complete search history.

(56) References Cited

U.S. PATENT DOCUMENTS

| | | | | |
|---|---|---|---|---|
| 5,794,210 A * | 8/1998 | Goldhaber et al. | ............. | 705/14 |
| 6,457,640 B2 * | 10/2002 | Ramachandran et al. | .... | 235/379 |
| 6,658,390 B1 * | 12/2003 | Walker et al. | .................. | 705/5 |
| 2001/0014868 A1 * | 8/2001 | Herz et al. | .................... | 705/14 |
| 2002/0004751 A1 * | 1/2002 | Seki et al. | ..................... | 705/20 |
| 2002/0107818 A1 * | 8/2002 | McEwen et al. | ............ | 705/400 |
| 2003/0018559 A1 * | 1/2003 | Chung et al. | .................. | 705/37 |
| 2003/0204447 A1 * | 10/2003 | Dalzell et al. | ................. | 705/26 |
| 2004/0039707 A9 * | 2/2004 | Ricci | ........................... | 705/59 |

FOREIGN PATENT DOCUMENTS

| | | |
|---|---|---|
| JP | 9-160991 | 6/1997 |
| JP | 10-198733 | 7/1998 |
| JP | 2001-118023 | 4/2001 |
| JP | 2001-175758 | 6/2001 |
| JP | 2001-297235 | 10/2001 |
| JP | 2001-312658 | 11/2001 |

OTHER PUBLICATIONS

Heun, Christopher T., "Online Swap Shop—Exchange Lets Users Trade Books (Internet/Web/Online Service Information)," Information Week, Apr. 16, 2001.*

* cited by examiner

*Primary Examiner*—John W Hayes
*Assistant Examiner*—Nathan Erb
(74) *Attorney, Agent, or Firm*—Staas & Halsey LLP

(57) ABSTRACT

A book recycling promotion device registers in advance a book purchased information of a customer and an electronic mail address of the customer, calculates a current buying price of the book based on a current sales information on the book included in the book purchased information, and sends an electronic mail including the buying price and a message to promote selling-off of the book to the electronic mail address corresponding to the book purchased information.

12 Claims, 10 Drawing Sheets

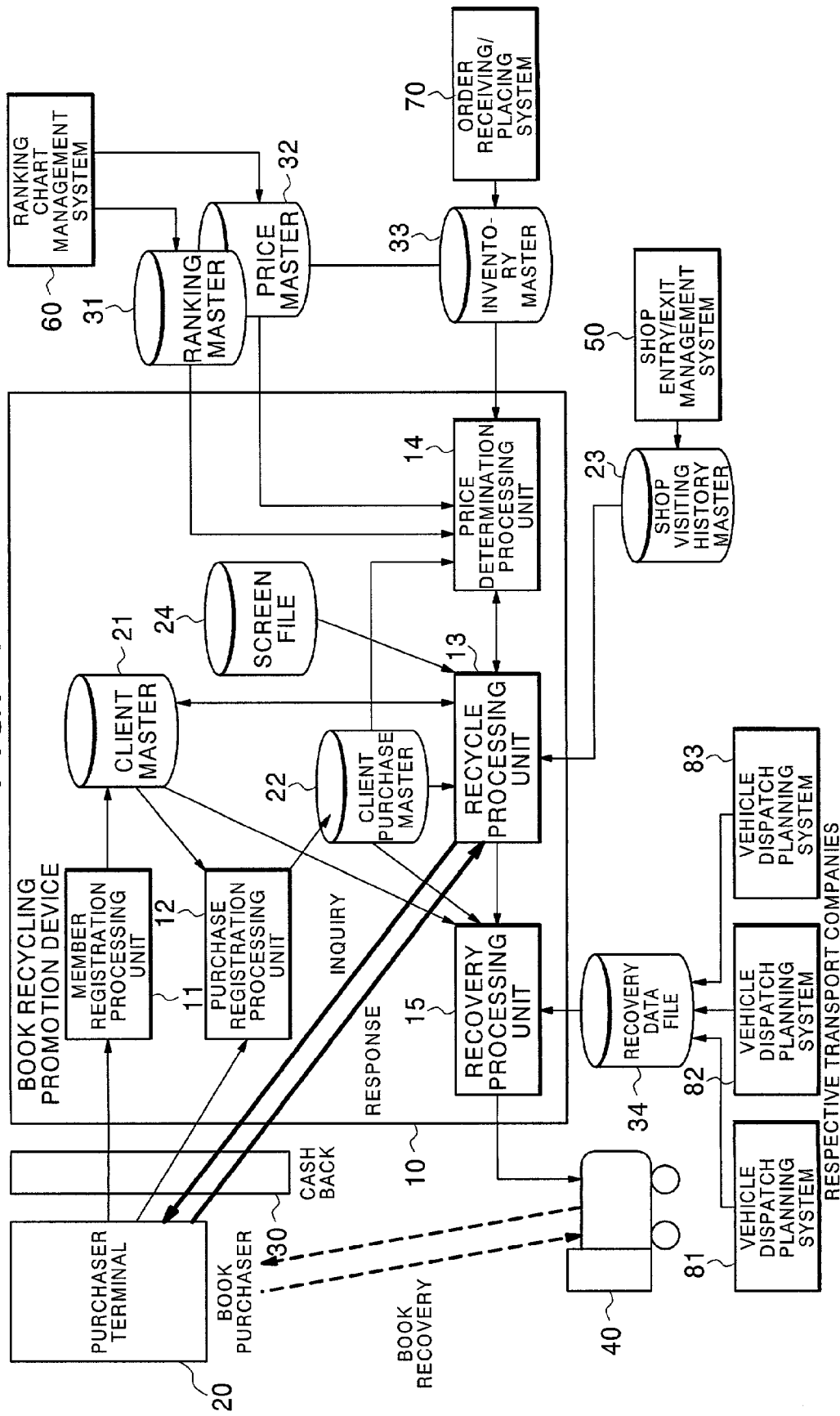

FIG. 2A

| CLIENT NAME | HOME ADDRESS | BUSINESS ADDRESS | ELECTRONIC MAIL ADDRESS | POINTS |
|---|---|---|---|---|
| MR. TARO FUJI | KAWASAKI-SHI, KANAGAWA .. | SHIBUYA-KU, TOKYO .. | XXX@zzz.com | 0 |
| MS. YAMADA | SAITAMA-SHI, SAITAMA .. | SHIBUYA-KU, TOKYO .. | MMM@ppp.co | 400 |
| . | . | . | . | . |
| . | . | . | . | . |

FIG. 2B

| PURCHASE ID | CLIENT NAME | BOOK TITLE | PURCHASE DATE | PURCHASE PRICE | RECYCLING FLAG | BUYING PRICE | MAIL SENDING HISTORY |
|---|---|---|---|---|---|---|---|
|  | MR. TARO FUJI | FUTURE "A" | 2001.07.30 | 1000 YEN | 1 | 500 YEN |  |
|  | MS. YAMADA | COMIC BOOK JAPAN | 2001.12.01 | 500 YEN | 2 | 400 YEN |  |
|  | . | . | . | . | . | . |  |
|  | MS. EDOGAWA | GHOST "B" | 2001.08.30 | 750 YEN | 3 | — |  |

FIG. 2C

| CLIENT NAME | SHOP VISITING DATE | SHOP VISITING TIME | HOME RETURN DATE | HOME RETURN TIME |
|---|---|---|---|---|
| MR. TARO FUJI | 2001.08.15 | 11:50 | 2001.08.15 | 12:30 |
| MS. YAMADA | 2001.12.15 | 20:00 | 2001.12.15 | 21:00 |
| . | . | . | . | . |
| . | . | . | . | . |

FIG. 3A

| BOOK TITLE | GENRE | RANKING | SALES DATE | UPDATING DATE |
|---|---|---|---|---|
| FUTURE "A" | POLITICS/ECONOMY | 3 RD | 1980.11.01 | |
| COMIC BOOK JAPAN | COMIC BOOKS | 5 TH | 1980.05.16 | |
| WHAT IS BMP?? | POLITICS/ECONOMY | 1 ST | 2000.12.24 | |
| . | . | . | . | |
| RU, RU, RU... | MAGAZINES | 105 TH | 2000.08.30 | |
| FLOWER CHILD | COMIC BOOKS | 15 TH | 1975.02.02 | |
| THIS IS MY PRECIOUS JAPAN | POLITICS/ECONOMY | 25 TH | 1999.09.09 | |

FIG. 3B

| GENRE | RANKING | BARGAINING RATE |
|---|---|---|
| POLITICS/ECONOMY | 1 ~ 3 RD | 50 % |
| POLITICS/ECONOMY | 4 ~ 20 TH | 30 % |
| POLITICS/ECONOMY | 20 ~ 100 TH | 15 % |
| COMIC BOOKS | 1 ~ 10 TH | 70 % |
| COMIC BOOKS | 11 ~ 50 TH | 50 % |
| MAGAZINES | 1 ~ 200 TH | 10 % |
| . | . | . |

FIG. 3C

| BOOK TITLE | NUMBER OF COPIES IN STOCK | THRESHOLD | ADDITION |
|---|---|---|---|
| FUTURE "A" | 10 COPIES | 5 COPIES | 5 % |
| COMIC BOOK JAPAN | 5 COPIES | 20 COPIES | 10 % |
| WHAT IS BMP?? | 100 COPIES | 5 COPIES | 5 % |
| . | . | . | . |
| RU, RU, RU... | 20 COPIES | 20 COPIES | 10 % |

FIG. 3D

| RECOVERY COMPANY | RECOVERY DATE AND TIME | RECOVERY ADDRESS |
|---|---|---|
| COURIER SERVICE A | 2001.09.06 15:00 | SHIBUYA-KU, TOKYO ·· |
| COURIER SERVICE B | 2001.09.06 15:00 | SAITAMA, SAITAMA ·· |
| TRANSPORT COMPANY C | 2001.09.06 15:00 | SHIBUYA-KU, TOKYO ·· |
| . | . | |

METHOD AND DEVICE FOR PROMOTING BOOK RECYCLING AND THEIR PROGRAM AND RECORDING MEDIUM

BACKGROUND OF THE INVENTION

1. Field of the Invention

The present invention relates to a method and a device for promoting book recycling and their program and recording medium, and especially to a method, device, program and recording medium that promotes selling-off of books by appealing to the person who purchased books that are in high demand to sell them off in a recycling markets for books.

2. Description of the Related Art

For a variety of books that their original purchasers finished and sold off, there exist lawful markets (recycling markets for books) for bringing them back into distribution chains again. In recycling of books, normally the purchaser of books sells them off on their own initiative when those books are no longer needed for some reason. Reasons for selling books off include, for example, lack of space to store them, desire to get rid of them at the time of move-out, a need of getting rid of finished books, etc.

Thus, nothing other than the owner's own decision prompts the owner of books to sell them off, i.e., what books come into a distribution chain and when they do so depends on the original book owner. On the other hand, the price at which one can sell a book cannot be known unless one goes to the actual site of a recycling shop, and it depends on unclear reasons such as the degree of damage of the book and an expectation that the book would be in high demand, i.e., it is often one-sidedly determined by the buyer side.

As described above, currently in recycling of books, one has to wait until owners of books sell them off on their own initiative. In this manner, however, the book in high demand cannot be brought into a distribution channel and active book recycling markets cannot be achieved, i.e., it is often the case that by the time people owning books in high demand try to sell them off on their own initiative the demand for the books is already low due to fleeting interest of general customers. Therefore, there is a need to promote selling-off of books by encouraging owners of books in high demand.

On the other hand, at the time of this appeal to promote selling-off, if buying prices are explicitly stated, people having intention to sell off their books may be strongly appealed to do so. Here, if the buying prices may be updated in real time tying them to the fluctuating prices of the book in the recycling market, it would be convenient for the both parties involved in the book trade. Those selling off books may select a time that they consider most advantageous to sell them off at their own risk. Also, they may find buying prices reasonable as those prices are tied to book prices in the recycling market. Those buying books can offer the most recent buying prices to provide further incentives for people to sell off their books.

Here, for example, Japanese Patent Application Laid-Open No. 9-160991 and Japanese Patent Application Laid-Open No. 10-198733 disclose sending of an electronic mail to a customer who previously purchased a certain product at a time point by which the product is likely to have been exhausted so as to promote re-purchasing of the same product. However, this is not for buying a used product, and thus no price will be presented. Japanese Patent Application Laid-Open No. 2001-118023 discloses notifying of a buying price after receiving a request from an owner of a product to have it bought However, this is not for promoting buying of a used product, and thus no incentive is provided by offering a buying price.

SUMMARY OF THE INVENTION

An object of the present invention is to provide a book recycling promotion method wherein an electronic mail is sent to a purchaser of a book in high demand to promote selling-off of the book.

Another object of the present invention is to provide a book recycling promotion device wherein an electronic mail is sent to a purchaser of a book in high demand to promote selling-off of the book.

Another object of the present invention is to provide a book recycling promotion system wherein an electronic mail is sent to a purchaser of a book in high demand to promote selling-off of the book.

Another object of the present invention is to provide a book recycling promotion program wherein an electronic mail is sent to a purchaser of a book in high demand to promote selling-off of the book.

Another object of the present invention is to provide a program recording medium recording a book recycling promotion program wherein an electronic mail is sent to a purchaser of a book in high demand to promote selling-off of the book.

The book recycling promotion method according to the present invention comprises registering a book purchased information, which is connected with a book, of a customer and an electronic mail address of the customer, calculating a current buying price of the book based on a current sales information on the book included in the book purchased information, and sending an electronic mail including the buying price and a message to promote selling-off of the book to the electronic mail address corresponding to the book purchased information.

The book recycling promotion device according to the present invention comprises means for registering to register a book purchased information, which is connected with a book, of a customer and an electronic mail address of the customer, means for calculating to calculate a current buying price of the book based on a current sales information on the book included in the book purchased information, and means for sending to send an electronic mail including the buying price and a message to promote selling-off of the book to the electronic mail address corresponding to the book purchased information.

The book recycling promotion system according to the present invention comprises a client used by a customer, a recycling promotion device to send an electronic mail to promote selling-off of a book to the customer, and a network to connect the client and the recycling promotion device. The recycling promotion device has the feature above-described.

According to the method, device, and system for promoting book recycling of the present invention, appeal may be provided for a person owning a book in high demand in a recycling market to sell off the book without waiting for the person to sell off the book on the person's own initiative. Thus, the book in high demand may be brought into a distribution channel to stimulate the activity of the book recycling market. Furthermore, according to the book recycling promotion method of the invention, at the time of appeal to promote selling-off, a buying price maybe offered based on sales information for the book (for example, fluctuations of price in the recycling market). Thus, those selling off their books may select a time that they consider most advantageous to sell them off at their own risk, and those buying books may offer the most recent buying prices (for example, prices tied to the above described demand) to provide a further incentive for people to sell off their books.

The book recycling promotion program according to the present invention is a program to implement the book recycling promotion device. The program causes a computer to execute registering a book purchased information, which is connected with a book, for a customer and an electronic mail address of the customer, calculating a current buying price of the book based on a current sales information on a book included in the book purchased information, and sending an electronic mail including the buying price and a message to promote selling-off of the book to the electronic mail address corresponding to the book purchased information.

The program recording medium for promoting book recycling according to the present invention is a computer-readable program recording medium recording the above described program implementing the book recycling promotion device.

According to the book recycling promotion program and its recording medium of the present invention, the above described method, device, and system for promoting book recycling may be implemented, and also the program may be provided in forms stored in various recording media. Thus, as described above, appeal may be provided for a person owning a book in high demand in a recycling market to sell-off the book, stimulating the activity of the book recycling market. Furthermore, by offering a buying price at the time of appeal to promote selling-off, those selling off their books may select a time that they consider most advantageous to sell them off, and those buying books may provide people intending to sell off their books with an incentive to sell them off.

BRIEF DESCRIPTION OF THE DRAWINGS

FIG. 1 is a block diagram showing a book recycling promotion system.

FIG. 2 describes book recycling promotion, especially FIG. 2A shows an exemplary customer master (or master file, hereafter the same) 21, FIG. 2B shows an exemplary customer purchase master 22, and FIG. 2C shows an exemplary shop visiting history master 23.

FIG. 3 describes book recycling promotion, especially FIG. 3A shows an exemplary ranking master 31, FIG. 3B shows an exemplary price master 32 FIG. 3C is an exemplary book inventory master 33, and FIG. 3D shows an exemplary recovery data file 34.

DETAILED DESCRIPTION OF THE PREFERRED EMBODIMENTS

Figure 4:
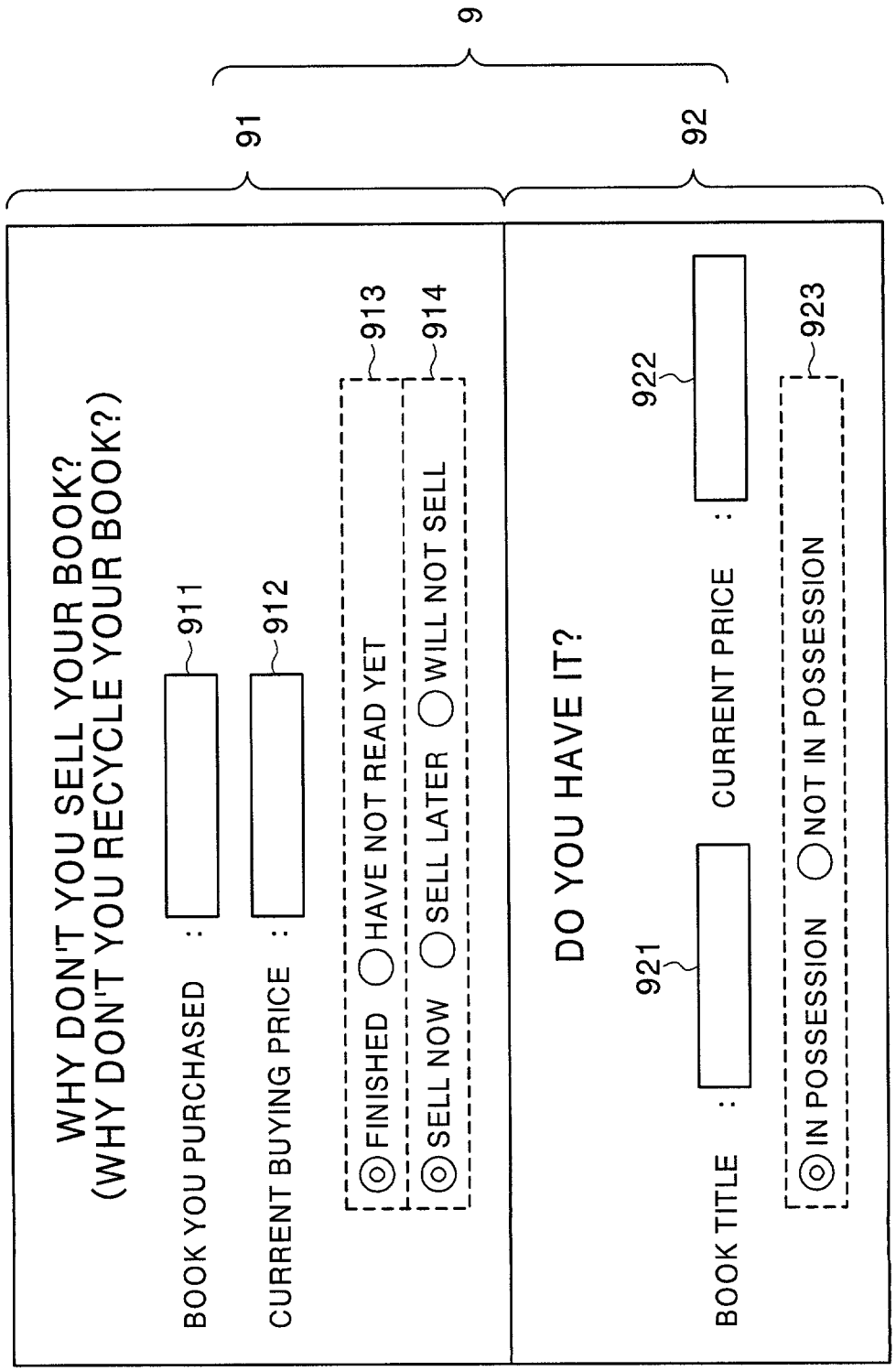
FIG. 4 describes book recycling promotion.

FIG. 1 is a block diagram of a book recycling promotion system in which the architecture of the book recycling promotion system is shown comprising a book recycling promotion device according to the present invention.

The book recycling promotion system comprises a book recycling promotion device 10, a terminal 20 to be used by a book purchaser (hereafter, purchaser terminal), and a network 30 which connects the book recycling promotion device 10 and the purchaser terminal 20. It performs actual recovery (or collect) of books and cash back operations (payment for the books bought) by a recovery company 40 according to the result of management processing at the book recycling promotion system. The book recycling promotion system utilizes various data created by separate systems including a shop entry/exit management system 50, a ranking chart management system 60, an order receiving/placing system 70, vehicle dispatch planning systems 81 to 83. These are all well known independent systems that create various data for their original purposes. The book recycling promotion system appropriates the data for a different purpose.

The book recycling promotion device 10 may be a computer or server which is provided, for example, in a book store, in a book recycling shop, or at a recycling company on a network provided by an Internet provider (for example, application service provider). The purchaser terminal 20 may be a computer or client (client device) which is provided at the home of a person purchasing a book. The network 30, for example, may be the Internet, though which communication is performed between the book recycling promotion device 10 and the purchaser terminal 20.

The book recycling promotion device 10 is provided with a member registration processing unit 11, a purchase registration processing unit 12, a recycle processing unit 13, a price determination processing unit 14, and a recovery processing unit 15. The book recycling promotion device is also provided with a customer master 21, a customer purchase master 22, a shop visit history master 23, and a screen file 24. The book recycling promotion device also utilizes a ranking master 31, a price mater 32, an inventory master 33, and a recovery data file 34.

The book recycling promotion device 10 is implemented by running a program to perform processing for book recycling promotion according to the invention on a computer that serves as the book recycling promotion device 10. The book recycling promotion program may be provided as a program recorded on a recording medium such as a flexible disk, CD-ROM, CDR/W, DVD, etc.

The member registration processing unit 11, in response to an application from a customer to become a member, registers the customer by entering required information (customer name and information) into the customer master 21. Such an application from a customer is made, for example, from a purchaser terminal 20 via network 30. Here, the customer may go to the shop where the book recycling promotion device 10 is provided to make an application by oral, or the customer may send an application to the shop via mail. Members are those customers registered in the customer master 21.

FIG. 2A shows an exemplary customer master 21. The customer master 21 comprises a number of records, each one of which stores customer information for each customer name. Client information comprises a customer address, a business address, an electronic mail address, points, etc. A business address may be stored if necessary, and it may be omitted. Points (or its current count) represent the difference between the total points that a customer has obtained by recycling books (i.e., by selling off books) and the total points corresponding to the amount of payment the customer has received from the recovery company at the time of book recovery. Initially on registration, the customer starts with "0 (or a blank field)" point. For example, 1 point represents 1 yen.

The purchase registration processing unit 12, in response to a book purchase by a customer, registers book purchase history by the customer by entering required information (customer name and book purchased information) into the customer purchase master 22. Prior to this registration, the purchase registration processing unit 12 consults the customer master 21 to verify that the customer is registered on it (i.e., that the customer is a member). Thus, such registration of purchase history is performed only when the purchaser is a member. Here, purchase history may be registered for a non-member customer if the customer so desires. A book purchase is made, for example, from a purchaser terminal 20 via network 30. Here, a customer may go to the shop where a book recycling promotion device 10 is provided and purchase the book directly.

FIG. 2B shows an exemplary customer purchase master 22. The customer purchase master 22 comprises a number of records, each one of which stores customer book purchased information for each customer. Client book purchased information comprises the title of a book a customer purchased, a purchase date, a purchase price, a recycling flag, a buying price, mail sending history, etc. For each customer and for each purchased book, one record is created.

A recycling flag is management information appended to book purchased information for a book to indicate a processing policy for the book based on a response from a customer to a recycling mail (or a message to promote selling-off) sent to the customer. It takes one of values 1 to 5 as its exclusive value so that a previous value is overwritten by a value being set afterward. However, value 4 will not be overwritten by value 5, nor value 5 by value 4, and thus a flag may assume both values simultaneously (both values are overwritten when another value being set).

A recycling mail is an electronic mail (email) sent to a purchaser terminal 20 by the book recycling promotion device 10 according to the invention. A purchase price is the price of a book when a customer bought it (list price), whereas a buying price is the price of a book when a customer recycles (sells off) the book. A buying price fluctuates in the present invention as described below. Mail sending history stores history of recycling mails sent to a customer.

Value 1 indicates that the book has already been recycled (sold off). In such a case, the book purchased information for the customer is excluded as a target for a recycling mail. Thus, sending of a junk (or troublesome) mail that would requests a book purchaser who has already completed recycling of the book to recycle it may be prevented. Value 2 indicates that the book is yet to be recycled (un-recyled). In such a case, the book purchased information for the customer is included as a target for a recycling mail. Thus, appeal may be given to the purchaser of the book for recycling the book. Value 3 indicates that the book will not be recycled (will not be sold off). In such a case, the book purchased information for the book with regard to the customer is excluded as a target for a recycling mail. Thus, sending of a junk mail that would requests a book purchaser having no intention of recycling the book to recycle it may be prevented. Value 4 indicates that a recycling mail will be sent again after a set number of days have passed. In such a case, the book purchased information for the book with regard to the customer is included as a target for a recycling mail after the set number of days have passed since the purchase date for the book. Thus, appeal may be given to a book purchaser who has a possibility of recycling the book to do the recycling. Value 5 indicates that a recycling mail will be sent again when the raking for the book changes. In such a case, the book purchased information for the book with regard to the customer is included as a target for a recycling mail if a ranking of sold number of copies for the book of the book purchased information changes. Thus, appeal maybe given to a book purchaser who has a possibility of recycling the book to do the recycling.

Here, since a recycling flag may take both values 4 and 5 simultaneously, a recycling mail may be sent to the terminal 20 of a purchaser who answered, "have not read (the book) yet" without waiting for the set number of days to pass, and a recycling mail may be sent to the terminal 20 of a purchaser who answered, "sell later" when the set number of days have passed even if the ranking has not changed. As these electronic mails are sent to purchasers who have intention to sell the books, they would not be regarded as junk. Here, values 4 and 5 may also be turned into exclusive values like other values, or a priority may be given to either one (value 5 in the present case) of values 4 and 5.

The recycling processing unit 13 consults the customer purchase master 22, the shop visiting history master 23, and the screen file 24 to perform book recycling processing. That is, the recycling processing unit 13 verifies the shop visiting history concerning a customer (member) who purchased a book existing in the customer purchase master 22 based on the shop visiting history master 23, and then creates a mailing screen to be sent to the customer consulting the screen file 24 (see FIG. 4), and then sends a recycling mail (electronic mail) including this screen to the customer to promote recycling. In the course of this book recycling processing, the recycling processing unit 13 invokes the price determination processing unit 14 to perform price determination processing. That is, a price determined by this processing is included in the mailing screen as the current buying price (or the buying price at the time of processing) of the book to be recycled. Based on a response from the purchaser terminal 20 to the recycling mail, the recycling processing unit 13 updates the points for the customer in the customer master 21 as well as the recycle flags for the customer and the book in the customer purchase master 22, and if the response is for recycling, invokes the recovery processing unit 15 to perform recovery processing. In this manner, recovery of actual books will be made possible.

FIG. 2C shows an exemplary shop visiting history master 23. The shop visiting history master 23 stores a shop visiting date, a shop visiting time, a home return date, a home return time, etc. for each customer name. Here, the shop visiting history master 23 may be supplied by an external shop entry/exit management system 50.

The ship visiting history master 23 is created by the shop entry/exit management system 50. In itself, the shop entry/exit management system 50 is a system for managing entry/exit of customers into/from the shop. For this purpose, for example, IC cards with radio data communication capability may be distributed to members registered in the customer master 21, asking them to carry the cards at the time of shop visit. Each time a member carrying the IC card passes through the shop entrance gate or exit gate (also these gates are provided with radio data communication capability), communication is performed between the IC card and the shop entrance gate or exit gate to manage the shop entry and exit of the customer. That is, a shop visiting date, a shop visiting time, a home return date, a home return time, etc. will be recorded on the shop visiting history master 23 as described above. The shop visiting history master 23 may also be created by some other means. For example, when a member purchases a book by accessing the book purchase system from a purchaser terminal 20, the access history may be recorded on the shop visiting history master 23 as shop visiting history. Shop visiting history may also be entered by a salesclerk based on a member's self-reporting.

FIG. 4 shows an exemplary mailing screen 9. Image data for the mailing screen 9 is stored in a screen file 24. The mailing screen 9 includes an upper survey question area 91 and lower inquiry area 92. Here, in the image data stored in the screen file 24, entry fields of both survey question area 91 and inquiry area 92 are left blank.

The survey question area 91 is provided with a book title field 911 for displaying the title of a book purchased by the customer, a price field 912 for displaying the current buying price for the book, a reading information entry field 913 for asking the customer whether or not the customer has finished the book of the tile, and a selling-off information entry field 914 for asking whether or not the customer would sell off the book. The reading information entry field includes answers "finished" and "have not read yet", and the selling-off information entry field includes answers "sell now", "sell later", and "will not sell". The inquiry area 92 is provided with a book title field 921 for displaying the book title to inquire the customer if the customer owns a copy, and a price field 922 for displaying the current buying price for the book. The inquiry area 92 is further provided with a ownership information entry field 923 for inquiring whether or not the customer owns the book. This field includes answers "in possession" and "not in possession". The ownership information entry field 923 is not necessarily required.

The price determination processing unit 14, when invoked by the recycling processing unit 13, consults the customer purchase master 22, the ranking master 31, the price master 32, and the inventory master 33 to perform price determination processing for determining the buying price for the book to be recycled. That is, the price determination processing unit 14 looks up the genre and ranking of the book in the ranking master 31 with the book title obtained from the customer purchase master 22, and then consulting the price master 32 based on this information, it determines the buying price for the book. A buying price has a basic portion and an added portion. The price determination processing unit 14 looks up in the inventory master 33 the number of book copies in stock (at the shop) with the book title, and then based on this information, (the basic portion of) the buying price is raised by a fixed value (added portion). By what value the price is to be raised is set in advance, for example, in the inventory master 33.

FIG. 3A shows an exemplary ranking master 31. The ranking master 31 stores for each book title its genre, its ranking within the genre, the sales date, the updating date, etc. A genre represents a class (or field) to which a book belongs, and a plurality of genres are set in advance. Rankings are determined on the basis, for example, of sold copies (or amount of sales) for respective genres, and updated periodically (for example, each week or month). A sales date is the first date on which a book became on sale. An updates date is the last date on which the ranking updated.

FIG. 3B shows an exemplary price master 32. The price master 32 stores a bargaining rate and the like for each ranking range within a genre for which the buying price is raised (added value is given). Bargaining rates and the like may be set for a plurality of ranking ranges within one genre. Ranking ranges for which a buying price is raised are intended to give incentives to a purchaser in the form of raised buying prices in order to promote recycling of highly ranked books. A bargaining rate is a parameter for converting an incentive to be given into a concrete monetary value. A bargaining rate is set, for example, as a certain percentage relative to the buying price looked up in the described above manner. Thus, depending on the fluctuations of the buying price, the value to be added may be changed. Here, the bargaining rate may also be set as a fixed amount of money (or number of points).

The ranking master 31 and the price master 32 may be created, for example, by a well known ranking chart management system 60. The ranking chart management system 60 looks up sales ranking for each book genre based on sold copies (or sales) data on various books across the nation or over the regions to which the book recycling promotion devices 10 belong, to create the ranking master 31. The ranking chart management system 60 also sets a bargaining rate for each ranking within a book genre based on the ranking master 31 to create the price master 32. A bargaining rate may be set in advance, or it may be externally entered during the creation of the price master 32. Here, the ranking master 31 and price master 32 may be created by some other means. For example, the ranking master 31 and the price master 32 maybe entered or created by a salesclerk.

FIG. 3C shows an exemplary book inventory master 33. The inventory master 33 stores for each book title the stocked number of copies, a threshold, an additional value, etc. The number of copies in stock represents, for example, the stocked number of copies at a shop (a shop where a recycling promotion device is provided). Here, the stocked number of copies may also be a value representing a sum total of copies in stock at a plurality of shops. A threshold and an additional value represent data for raising the buying price for a book by a fixed value based on the number of book copies in stock, and they are set in advance. That is, the bargaining rate is raised by the additional value when the number of book copies in stock is below the threshold.

The inventory master 33 maybe created, for example, by a well known external order receiving/placing system 70. Based on order receiving and placing (or sales) data for various books at shops to which book recycling promotion devices 10 belong, the order receiving/placing system 70 looks up for each book the stocked number of copies at the shops. Then by appending a threshold and an additional value to this information, it creates the inventory master 33. A threshold and an additional value may be set for each book, each book genre, or each ranking for each book genre, or they may be externally entered during the creation of the inventory master 33. Here, the inventory master 33 may be created by some other means. For example, the inventory master 33 may be entered or created by a salesclerk.

The recovery processing unit 15, when invoked by the recycling processing unit 13, by consulting the customer master 21, the customer purchase master 22, and the recovery data file 34, performs recovery processing to create a recovery plan for a book to be recycled. That is, the recovery processing unit 15 sends an electronic mail to a customer based in the customer master 21 to have a desired date, time, and site for recovery specified, and based on this result and the recovery data file 34, determines a recovery company capable of carrying out the recovery at the recovery site on the date and time to request the recovery. The recovery processing unit 15 hands over a copy of the customer record (data) to the recovery company.

FIG. 3D shows an exemplary recovery data file 34. The recovery data file 34 stores for each recovery company dates, time frames, sites etc. for which it is capable of carrying out recovery. Thus, a company (and its delivery route) whose registered dates, time frames, and sites most closely match the date, time, and site desired by the customer may be selected.

The recovery data file 34 is created by well known external vehicle dispatch planning systems 81 to 83 of respective transport companies. That is, respective company register on their respective external vehicle dispatch planning systems 81 to 83, dates and addresses on one or plurality of delivery routes for which recovery may be performed.

Next, book recycling process to be performed by the book recycling promotion device 10 of FIG. 1 will be described in detail with reference to FIGS. 5 to 11.

Figure 5:
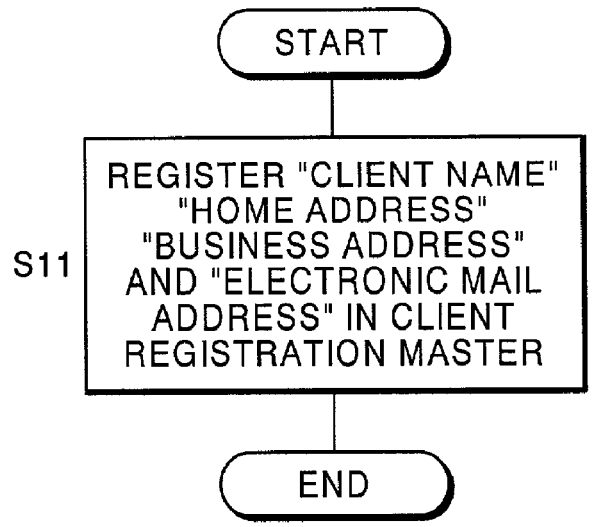
FIG. 5 is a flow chart for member registration processing.

FIG. 5 is a flow chart for member registration processing performed by the member registration processing unit 11.

For example, when a customer applies for membership, the member registration processing unit 11 registers on (enter into) the customer master 21 predetermined data concerning the customer (step S11). At this moment, the customer has "0" point.

Figure 6:
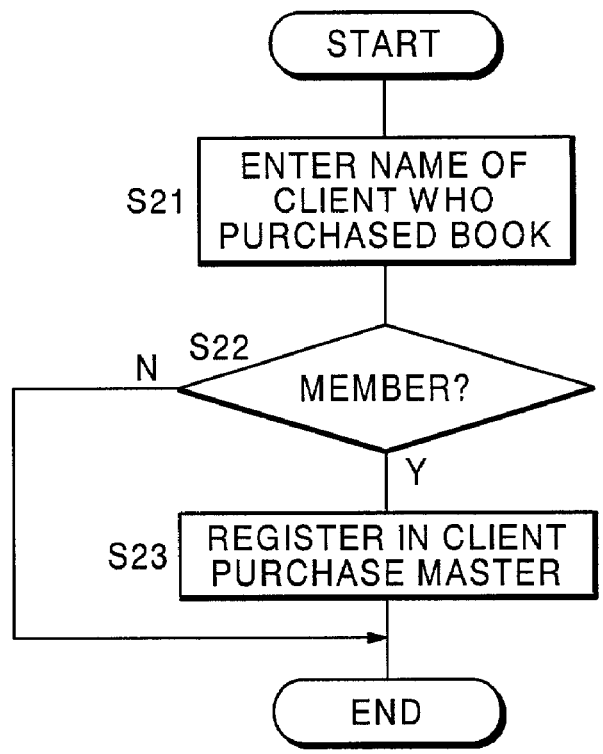
FIG. 6 is a flow chart for purchase registration processing.

FIG. 6 is a flow chart for purchase registration processing performed by the purchase registration processing unit 12.

When the name of a customer who purchased a book is entered (step S21), the purchase registration processing unit 12 performs a search in the customer master 21 using the name of the customer as a key to see if the customer is a member (step S22), and registers customer data for the customer in the customer purchase master 22 (step S23). At this point, the purchase registration processing unit 12 sets the recycling flag to "2" to indicate the un-recycled state, and leaves the buying price to be "0".

Figure 7:
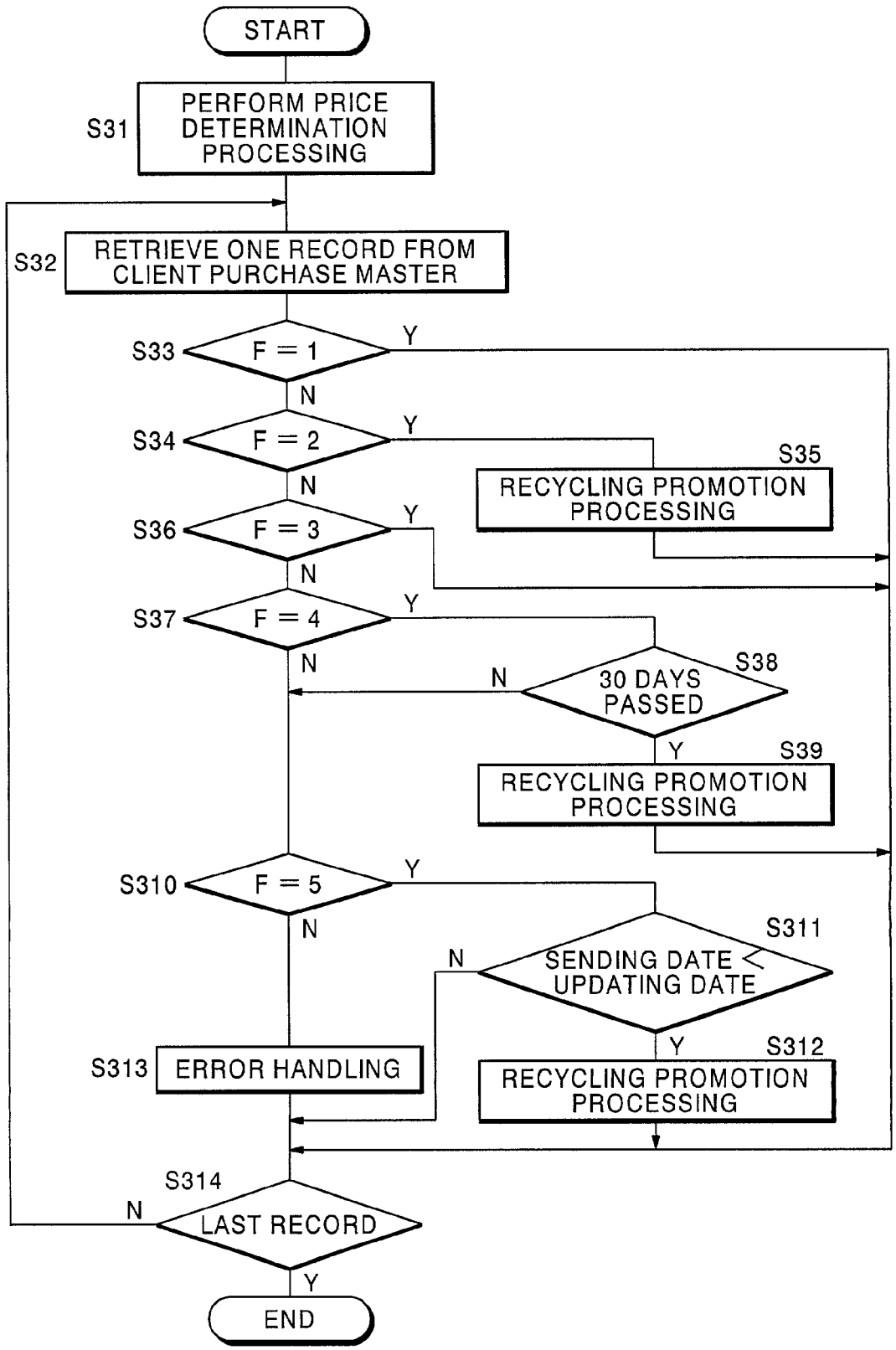
FIG. 7 is a flow chart for recycle processing.

FIG. 7 is a flow chart for recycle processing performed regularly by the recycle processing unit 13 at predetermined intervals.

The recycle processing unit 13 invokes the price determination processing unit 14 to perform price determination processing for each record in the customer purchase master 22 (step S31). Price determination processing will be described later with reference to FIG. 8. Thus, a price determined in this manner will be registered as the buying price in the customer purchase master 22.

In practice, such price determination processing may be performed when book ranking is changed in the ranking master 31. For example, since ranking is typically changed once a week, price determination processing may also be performed once a week immediately after ranking has been changed. On the other hand, Steps from S32 on need to be performed regularly in a shorter cycle independently of ranking changes. For example, steps from S32 on may be performed as often as once a day at a set time (for example, at noon) during business hours (or once an hour, once every few hours, or once every few days, etc.) on all the records in customer purchase master 22 as described above.

The price determination processing may be performed on each record. That is, it may be performed on a single record retrieved after step S32, or it may be performed after verifying that the recycling flag is neither values 1 nor 3 (i.e., if "NO" in steps S33 and S36) following step S32.

Then, the recycle processing unit 13 retrieves one record at a time starting at the top of the customer purchase master 22 (step S32) to see if the recycling flag (shown "F" in FIG. 7 and hereafter) is set to "1" (step S33). If it is set to "1", the recycle processing unit 13 checks the record to see if it is the last record (step S314), and if so, terminates the processing, and if not, performs steps from S32 on.

If the recycling flag is not set to "1" in step S33, the recycle processing unit 13 checks the recycling flag to see if it is set to "2" (step S34). If so, it performs the recycling promotion processing as described later with reference to FIG. 9 (step S35), and then proceeds to step S314.

If the recycling flag is not set to "2" in step S34, the recycle processing unit 13 checks the recycling flag to see if it is set to "3" (step S36). If so, it proceeds to step S314.

If the recycling flag is not set to "3" in step S36, the recycle processing unit 13 checks the recycling flag to see if it is set to "4" (step S37). If so, the recycle processing unit 13 looks up the purchase date on the record (i.e., the customer purchase master for the customer) to see if a predetermined amount of time has passed to date (as of now) since the purchase date (step S38). Here, for a set amount of time, an estimated date and time, for example, 30 days after the purchase date, by which the customer is expected to have finished the purchased book may be specified. If the set amount of time has not passed, the recycle processing unit 13 proceeds to step S 310. If the set amount of time has passed, it performs part of the recycling promotion processing of FIG. 9 (step S39), and then proceeds to step S314. That is, in the recycling promotion processing of FIG. 9, steps S51 to S53 are omitted, and steps from S54 on are performed starting from the point denoted as #A in the drawing (the same is true for step S312).

If the recycling flag is not set to "4" in step S37, the recycle processing unit 13 checks the recycling flag to see if it is set to "5" (step S310). If so, the recycle processing unit 13 compares the most recent sending date in the mail sending history from the record (i.e., the customer purchase master for the customer) with the updating date of the ranking obtained from the ranking master 31 by means of the book title from the record to see if the sending date is more recent than the updating date (step S311). If not (i.e., older), the recycle processing unit 13 proceeds to step S314. If so, it performs part of the recycling promotion processing of FIG. 9 (step S312), and then proceeds to step S314.

If the recycling flag is not set to "5" in step S310, since a state in which the recycling flag is not set to any one of values "1" to "5" is abnormal, the recycle processing unit 13 first handles the error such as by giving the operator an alarm (step S313), and then proceeds to step S314.

In step S314, whether all the records in the customer purchase master 22 have been processed is checked. If not all have been processed, steps from S32 on are repeated. After all the records have been processed, the recycle processing will be terminated.

Figure 8:
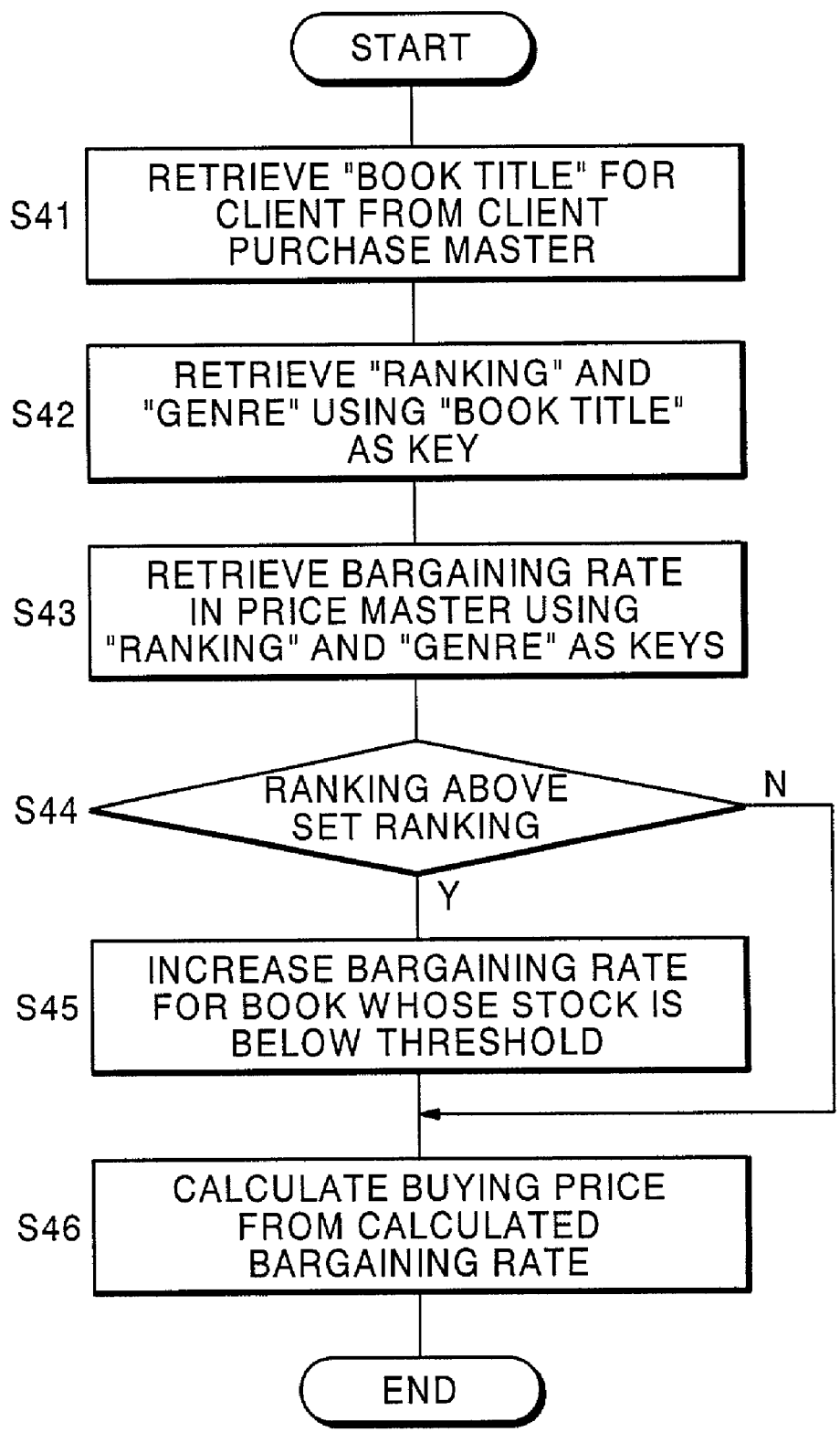
FIG. 8 is a flow chart for price determination processing.

FIG. 8 is a flow chart for price determination processing to be performed by the price determination processing unit 14 in step S31 of FIG. 7.

The price determination processing unit 14 obtains a book title for the customer from the customer purchase master 22 (step S41), and then retrieves the ranking and genre of the book from the ranking master 31 using the book title as a key (step S42). The price determination processing unit 14 further obtains the bargaining rate for the ranking and the genre from the price master 32 using the ranking and the genre as keys (step S43) to see if the title's ranking is higher than a predetermined rank (place) (step S44). A predetermined rank, for example, may be set to the 20th place. If the title's ranking is higher than the predetermined rank, the price determination processing unit 14 performs the addition processing by consulting the inventory master 33 using the book title as a key (step S45). That is, it obtains the number of the books in stock, the threshold, and the additional value from the inventory master 33, and if the number of the book in stock is below the threshold, it adds the additional value to the bargaining rate looked up in S43. If the title's ranking is not higher than the predetermined rank (place) in step S44, step S45 is omitted. Then, the price determination processing unit 14 calculates the buying price for the book with the calculated bargaining rate (step S46). That is, it retrieves a price from the purchase price in the customer purchase master 22 using the book title as a key, multiplies it by the calculated bargaining rate, and then registers it as the buying price for the book in the customer purchase master 22. Here, the calculated purchase price may be registered for the book in the inventory master 33.

Figure 9:
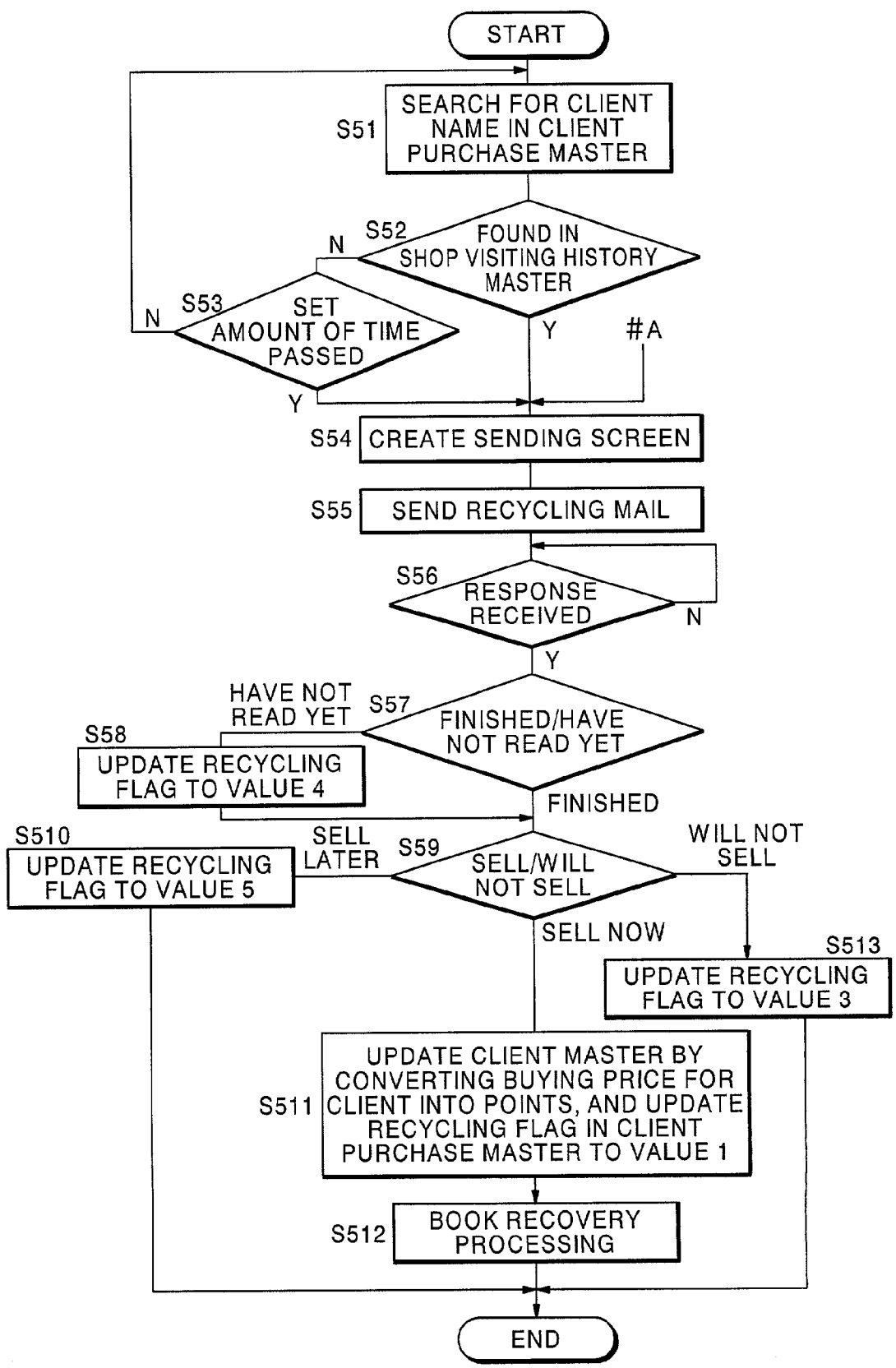
FIG. 9 is a flow chart for recycle processing.

FIG. 9 is a flow chart for recycling promotion processing to be performed by the recycle processing unit 13 in step S35 of FIG. 7.

The recycle processing unit 13 searches for the name of a customer for whom the recycling flag is set to "2" in the customer purchase master 22 to extract the name (step S51), and then it performs a search in the shop visiting history master 23 with the customer name as a key to see if the customer may be found there (step S52). If the customer is not found there, the recycle processing unit 13 looks up the purchase dates for the customer in the customer purchase master 22 to see if a set amount of time has passed to date (as of now) since the purchase date (step S53). Here, for a set amount of time, an estimated date and time, for example 30 days after the purchase date, by which the customer is expected to have finished the purchased book may be specified. If the set amount of time has not passed, steps from S51 on are repeated. Here, such a set amount of time maybe set to a different value for each book, each genre, each ranking of each genre etc.

If the customer is found in step S52, and if the set amount of time has passed in step S53, the recycle processing unit 13 creates a mailing screen (step S54). The processing for creating a mailing screen will be described later with reference to FIG. 10. The recycle processing unit 13 retrieves an electronic mail address in the customer master 21 with the customer name as a key, sends the mailing screen to the electronic mail address (i.e., the purchaser terminal 20 of the customer) via electronic mail (step S55), and checks to see if a response from the purchaser terminal 20 has been received (step S56), repeating step S56 until a response has been received.

If a response is received, the recycle processing unit 13 checks the response to see how the customer answered with regard to whether or not the customer has finished the book (step S57). If the answer is "have not read yet", the recycling flag for the customer in the customer purchase master 22 is set to "4" (step S58). As a result, the processing goes to step S39 of FIG. 7 where the processing of FIG. 9 (processing of steps from S54 on) is performed. That is, after a set amount of time (for example, after 30 days), a similar recycling mail will be sent again. If the answer is "finished" in step S57, after step S58, the recycle processing unit 13 checks the response to see how the customer answered with regard to whether or not the customer intends to sell the book (step S59).

If the answer is "sell later", there cycle processing unit 13 sets the recycling flag for the customer in the customer purchase master to "5" (step S510). As a result, if there is a ranking change for the book, the processing goes to step S312 of FIG. 7, and thus the processing of FIG. 9 (the processing of the steps from S54 on) are performed. That is, a similar recycling mail reflecting a corresponding price change will be sent again.

If the answer is "sell now" in step S59, the recycling processing unit 13 updates the points for the customer in the customer master 21, adding points corresponding to the buying price (the price displayed on the mailing screen, that is, the buying price in the customer purchase master 22), and then set the recycling flag for the customer in the customer purchase master 22 to "1" (step S511), that is, to the value for "recycled". Then, the recycle processing unit 13 invokes the recovery processing unit 15 to perform recovery processing (step S512). The recovery processing will be described later with reference to FIG. 11.

If the answer is "will not sell" in step S59, the recycle processing unit 13 sets the recycling flag for the customer in the customer purchase master 22 to "3" (step S513), that is to the value for "non-recycling".

Figure 10:
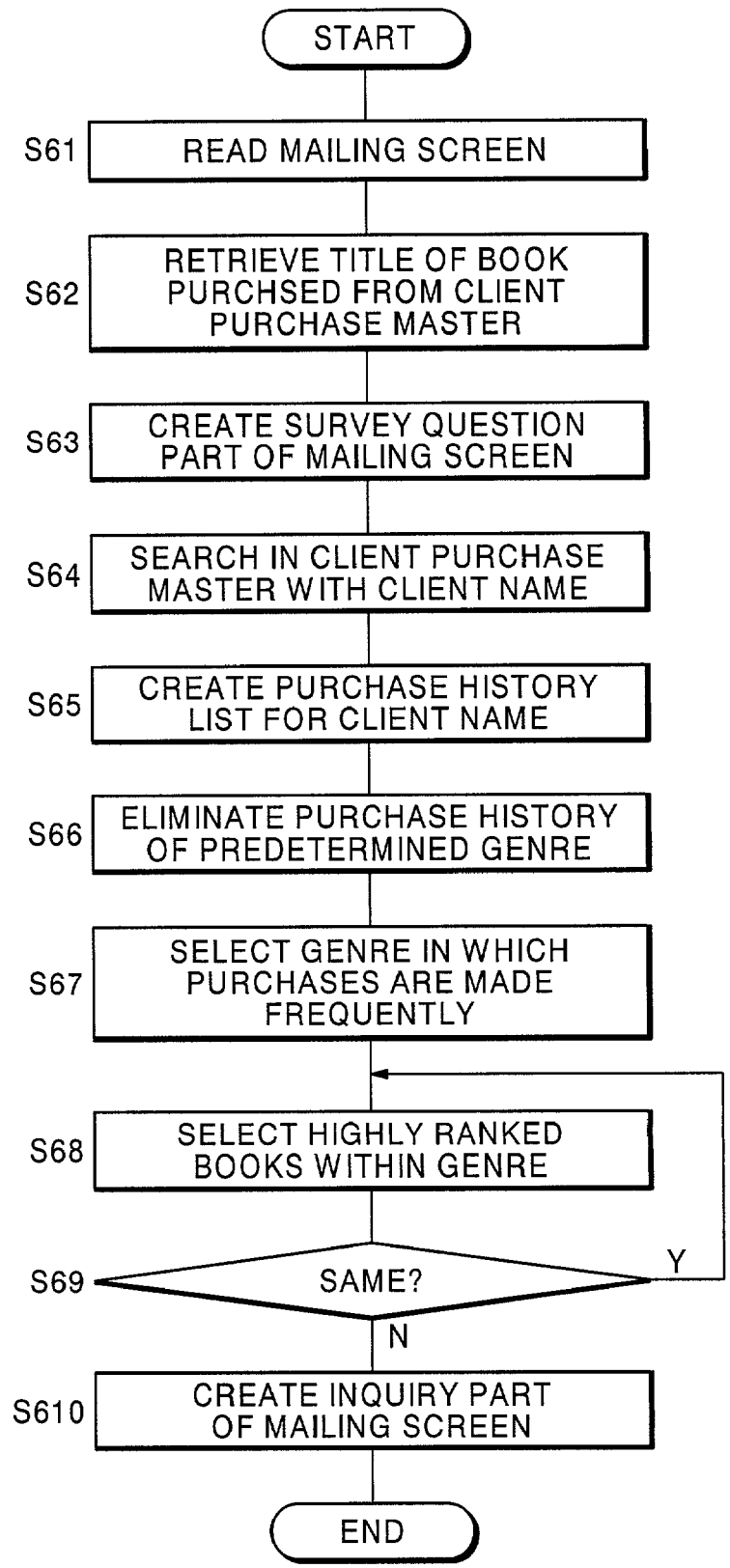
FIG. 10 is a flow chart for processing to create a sending screen.

FIG. 10 is a flow chart for processing to create a mailing screen performed by the recycle processing unit 13 in step S55 of FIG. 9.

The recycle processing unit 13 invokes and retains the mailing screen 9 from the screen file 24 (step S61), and at the same time retrieves the title and the (current) buying price for the book from the customer purchase master 22 with the purchase ID as a key (step S62) to create the survey question area 91 of the mailing screen 9 (step S63). That is, the recycle processing unit 13 enters the book title and the buying price into the book title field 911 and the price field 912 respectively.

Then, the recycle processing unit 13 performs a search in the customer purchase master 22 with the customer name as a key (step S64) to extract books (and their genres) purchased by the customer, thus creating a purchase history list for the customer (not shown) based on the search result (step S65). Then, the recycle processing unit 13 eliminates purchase history of predetermined genres (or book purchase information which are connecting with the books belonging to the predetermined genres) from the created purchase history list (step S66). For example, genres such as for dictionaries are eliminated as they are rarely recycled. Predetermined genres are set in advance.

Then, on the purchase history list, the recycle processing unit 13 calculates the number of copies (frequency) purchased in each genre to select one (or more) top genre(s) in which there are more purchased copies (step S67). In addition, the recycle processing unit 13 selects one (or more) top ranking book(s) for the genre (step S68) and see if the selected book corresponds to the book obtained in step S62 (step S69). If they are the same, step S68 is repeated. If they are not the same, based on the result of this selection, the recycle processing unit 13 creates the inquiry area 92 in the mailing screen 9 (step S610). That is, the recycle processing unit 13 retrieves the (current) buying price from the customer purchase master 22 using the selected book title as a key, and enters the book title and the buying price in the book title field 921 and the price field 922 of the inquiry area 92 respectively. With this processing, efficient inquiries can be made for books that would be in high demand (high ranking books in each genre) in a recycling market, directing them to customers who have no purchase record in the customer purchase master 22 but who are likely to have purchased those books (who have frequently purchased books in the same genre) at other book stores, thus finding out if they have the books (to solicit recycling).

Figure 11:
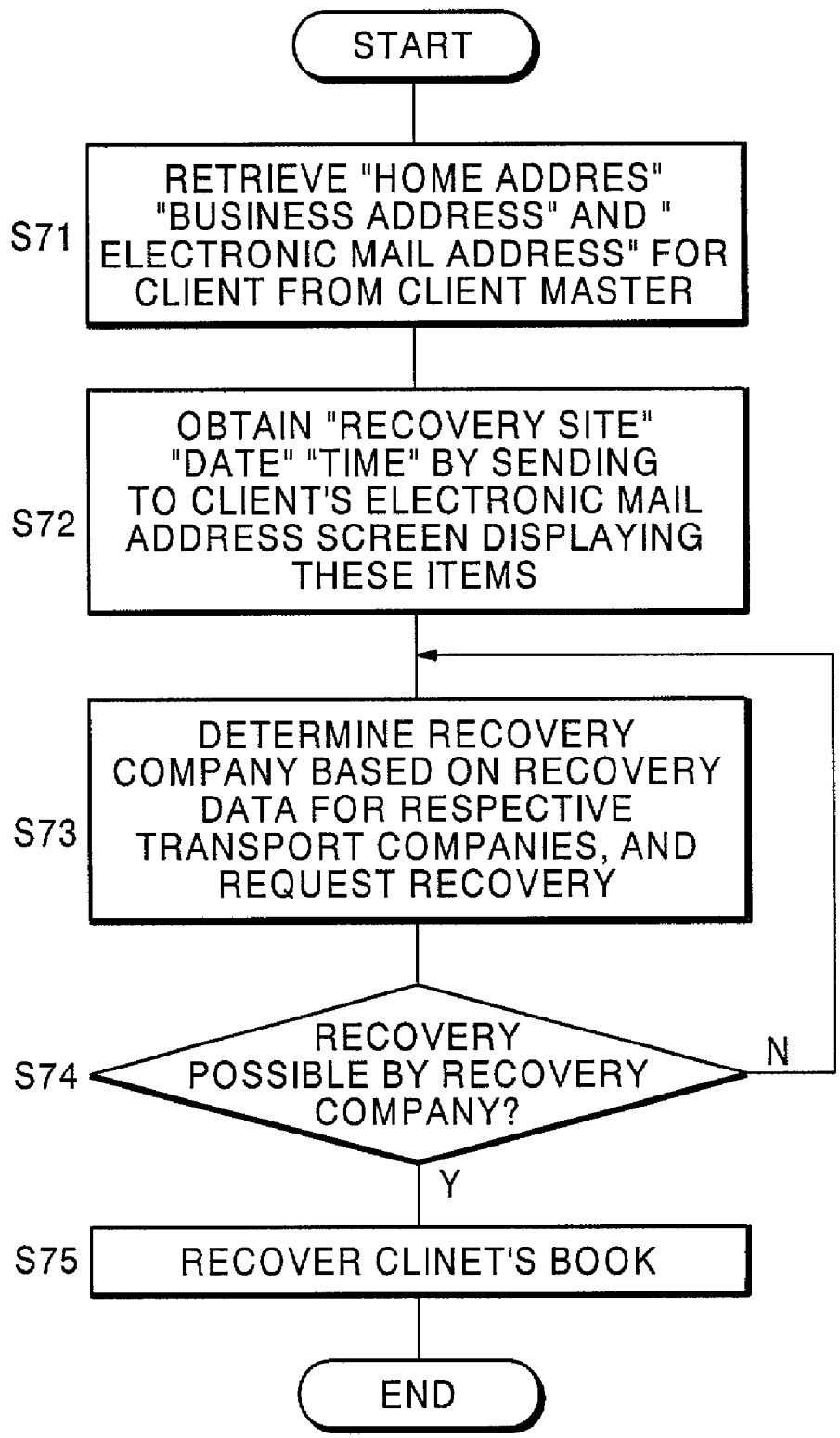
FIG. 11 is a flow chart for recovery processing.

FIG. 11 is a flow chart for recovery processing to be performed by the recovery processing unit 15 in step S512 of FIG. 9.

The recovery processing unit 15 retrieves the home address, the business address, and the electronic mail address of the customer from the customer master 21 using the customer name as a key (step S71), sends an electronic mail to the electronic mail address of the customer (i.e., to the purchaser terminal 20) to inquire the customer about the desired recovery site (address), date, and time, and obtains the data by getting a response (step S72). In practice, this electronic mail will be immediately sent as an inquiry screen to inquire about the recovery address if a response "sell now" is returned from the purchaser terminal to the screen of FIG. 4 sent in step S55 of FIG. 9. In this inquiry screen, the recovery address retrieved from the customer master 21 will be displayed.

Then, the recovery processing unit 15 performs a search in the recovery data file 34 with the recovery address, date, and time as keys. Based on this search result, it determines recovery companies to request for recovery (step S73), and see if the recovery is possible (step S74). For example, electronic mail addresses of recovery companies may be stored in the recovery data file 34. The recovery processing unit 15 copies the record from the customer purchase master 22 with the purchase ID as a key, and by looking up the electronic mail address of the selected recovery company in the recovery data file 34, sends the record of the purchase ID along with the recovery address, date, and time. If the recovery is not possible, step S73 will be repeated. If the recovery is possible, the recovery company will recover the book from the customer at the recovery address, date, and time (step S75). At the time of this recovery, the recovery company pays the customer the amount corresponding to the buying price in the customer purchase master 22. Afterward, the recovery company appends information indicating that the payment has been made to the record of the purchase ID and send the record to the book recycling promotion device 10. Upon receiving this record, the book recycling promotion device 10 deletes the buying price in the record of the purchase ID with appended information indicating that the payment has been made, and subtracts corresponding points from the points in the customer master 21.

For example, "Ms. Yamada" is registered as a member in the customer master 21 of FIG. 2A by the processing of FIG. 5. At this moment, the customer has "0" point. Then, "Ms. Yamada" purchases "Comic Book Japan" at a list price of 500 yen on Dec. 1, 2001. In this case, by the processing of FIG. 6, the book purchased information is registered in the customer purchase master 22 of FIG. 2B, and the recycling flag is set to F=2. That is, the recycling flag is set to a value to indicate that the book is yet to be recycled. Here, this book purchased information later becomes a target for which a recycling mail will be sent (step S34 of FIG. 7).

Then, the processing of FIG. 7 is started, for example, at noon every day, with regard to this book purchased information. By step S31, the buying price is calculated based on respective rankings with reference to FIGS. 3A to 3C, and the result is registered as the buying price in the customer purchase master 22 of FIG. 2B (the processing of FIG. 8). As the ranking of "Comic Book Japan" is the 5th in the genre "comic books", the bargaining rate of the basic portion will be "70%". As the stocked number of copies "5" is below the threshold "20 copies", the added portion of the bargaining rate to be added will be "10%". Thus, the buying price will be 500 yen multiplied by (70%+10%)=400 yen.

Then, the recycling flag will be checked (step S32). In step S34 of FIG. 7, since the recycling flag is set to F=2, the processing of FIG. 9 will be performed (step S35). Here, "Ms. Yamada" has visited the shop after the purchase date as shown by the shop visiting history master 23 of FIG. 2C (step S52 of FIG. 9). Therefore, in this case, a recycling mail including the screen of FIG. 4 may be sent from the book recycling promotion device 10 to the electronic mail address (i.e., purchaser terminal 20) of "Ms. Yamada" registered in the customer master 21 on the next day of her visit to the store. Also, for example, when 30 days have passed since the purchase date (step S53 of FIG. 9), are cycling mail maybe sent again to the electronic mail address of "Ms. Yamada".

Based on the response from "Ms. Yamada" who has read the recycling mail, the recycling flag may be updated or reset, and based on the recycling flag that has been updated or reset, the book purchased information may be managed. That is, if the response is "have not read yet", the recycling flag will be set to F=4 (step S58 of FIG. 9). That is, the recycling flag will be set to a value indicating that a set number of days are necessary for the customer to finish the book. In this case, after a set number of days have passed since the purchase of the book (step S38 of FIG. 7), a recycling mail will be sent (step S39 of FIG. 7). If the response is "sell now", points (400) corresponding to the buying price (400 yen) is given in the customer master 21, and the recycling flag will be set to F=1 (step S511 of FIG. 9). That is, the recycling flag will be set to a value indicating that the book has been recycled. In this case, the purchaser's book becomes a target of the recycle processing (step S512 of FIG. 9), and thereafter the book purchased information will be excluded as a target for a recycling mail (step S33 of FIG. 7). If the response is "sell later", the recycling flag will be set to F=5 (step S510 of FIG. 9). That is, the recycling flag will be set to a value indicating that there is a possibility for the book to be recycled. In this case, if the ranking of sold number of copies for the book changes (step S311 of FIG. 7), a recycling mail will be sent (step S312 of FIG. 7). If the response is "will not sell", the recycling flag will be set to F=3 (S513 of FIG. 9). That is, the recycling flag will be set to a value indicating that the book will not be recycled. In this case, thereafter, the book purchased information will be excluded as a target for a recycling mail (step S36 of FIG. 7).

While the present invention has been described above in detail according to its preferred embodiment, various modifications are possible within the scope of the invention. For example, in the preferred embodiment, by way of example, the invention has been described in terms of book recycling. However, the present invention is not limited to book recycling, and it may be applied to recycling of any items for which lawful recycling markets exist.

As described above, according to the invention, a book recycling promotion method is provided wherein an electronic mail including a buying price based on sales information for a book as well as a message to promote selling-off of the book is sent to a purchaser of the book. In this manner, appeal may be provided for a person owning a book in high demand in a recycling market to sell off the book without waiting for the person to sell off the book on the person's own initiative. Thus, the book in high demand may be brought into a distribution channel to stimulate the activity of the book recycling market. Furthermore, by offering buying prices based on sales information for books at the time of appeal to promote selling-off, those selling off their books may select a time that they consider most advantageous to sell them off at their own risk, and those buying books may offer the most recent buying prices to provide a further incentive for people to sell off their books. As a result, selling-off of book in high demand may be further promoted.

Furthermore, according to one preferred embodiment of the invention, a book recycling promotion method is provided wherein an electronic mail including a message is sent to a customer, the message requesting selling-off of a book that is highly ranked within a genre in which the customer has bought many books. In this manner, efficient inquiries can be made for books that would be in high demand in a recycling market, directing them to customers who have no purchase record in the customer purchase master but who are likely to have purchased those books at other book stores, thus finding out if they have the book to solicit recycling.

What is claimed is:

1. An item recycling promotion method executed by a server computer, which is connected to a client computer used by a first customer via a network, the method comprising:

registering genres with items ranked within each of the genres;

correlating customer names with item names, purchase information including purchase prices, and electronic mail addresses of customers who purchased at least one of the items;

correlating the item names with ranks of the items in the genres;

calculating current buying prices of items based on the purchase prices, the genres of the items and the ranks of the items in the genres;

retrieving a first item name of a first item which is correlated with a first customer name belonging to the first customer and purchase information;

selecting a first genre in which the first customer most frequently purchased according to purchase information correlated with the first customer name; selecting a second item name of a second item which is most highly ranked in the first genre;

sending an electronic mail, including the calculated current buying price of the first item and the first item name, and the calculated current buying price of the second item and the second item name, to the electronic mail address of the first customer, when the second item name in the purchase information correlated with the first customer is different than the first item name; and sending an electronic mail, including the calculated current buying price of the first item and the first item name, but excluding the calculated current buying price of the second item and the second item name, to the electronic mail address of the first customer, when the second item name in the purchase information correlated with the first customer is the same as the first item name.

2. The item recycling promotion method according to claim 1, wherein selecting the first genre comprises:

eliminating a purchase information for a predetermined second genre from a plurality of purchase information which are correlated with the first customer; and selecting the first genre in which the first customer most frequently purchased, according to purchase information correlated with the first customer name but not the eliminated purchase information for the predetermined second genre.

3. The item recycling promotion method according to claim 2 further comprising:

when the first item name in the purchase information correlated with the first customer is the same as the second item name, identifying a next highly ranked item after the first and second items within the first genre, and further including the calculated current buying price of the next highly ranked item and the name of the next highly ranked item in the electronic mail to the first customer.

4. The item recycling promotion method according to claim 1, wherein the ranks of the items in the genres are rankings of sold numbers of copies of the items within the genres to which the items belong, and wherein the buying prices change in accordance with changes in the rankings.

5. The item recycling promotion method according to claim 1 further comprising:

receiving a response to the electronic mail from the first customer;

appending a management information to the purchase information for the first customer based on the response, the management information indicating a processing policy for the purchase information;

managing the purchase information for the first customer by use of the management information;

if the appended management information indicates that the first item has already been recycled, excluding the first item from future electronic mail inquiring about the first customer selling items; and if the appended management information does not indicate that the first item has already been recycled, not excluding the first item from future electronic mail inquiring about the first customer selling items on the basis of the first item having already been recycled.

6. The item recycling promotion method according to claim 1 further comprising:

receiving a response to the electronic mail from the first customer;

appending a management information to the purchase information for the first customer based on the response, the management information indicating a processing policy for the purchase information;

managing the purchase information for the first customer by use of the management information;

if the appended management information indicates that the first item will not be recycled, excluding the first item from future electronic mail inquiring about the first customer selling items; and if the appended management information does not indicate that the first item will not be recycled, not excluding the first item from future electronic mail inquiring about the first customer selling items on the basis of an indication that the first item will not be recycled.

7. The item recycling promotion method according to claim 1 further comprising:

receiving a response to the electronic mail from the first customer; appending a management information to the purchase information for the first customer based on the response, the management information indicating a processing policy for the purchase information;

managing the purchase information for the first customer by use of the management information;

if the appended management information indicates that a predetermined number of days are necessary for the first customer to finish the first item, including the first item in a future electronic mail, inquiring about the first customer selling the first item, after the predetermined number of days have passed since the first customer purchased the first item; and if the appended management information does not indicate that a predetermined number of days are necessary for the first customer to finish the first item, not directing that the first item be included in a future electronic mail, inquiring about the first customer selling the first item, after a predetermined number of days have passed since the first customer purchased the first item.

8. The item recycling promotion method according to claim 1 further comprising:

receiving a response to the electronic mail from the first customer;

appending a management information to the purchase information for the first customer based on the response, the management information indicating a processing policy for the purchase information;

managing the purchase information for the first customer by use of the management information;

if the appended management information indicates that there is a possibility for the first item to be recycled, including the first item in a future electronic mail, inquiring about the first customer selling the first item, according to changing sales information, the sales information including a ranking of sold number of copies for the first item; and if the appended management information does not indicate that there is a possibility for the first item to be recycled, not including the first item in a future electronic mail inquiring about the first customer selling the first item.

9. The item recycling promotion method according to claim 1 wherein the calculated current buying price includes a basic portion and an added portion that is a predetermined value.

10. An item recycling promotion device, which is connected to a client computer used by a first customer via a network, the device comprising:
  means for registering item names, purchase information including purchase prices and electronic mail addresses of customers who purchased items, while correlating with customer names;
  means for registering genres of the items and ranks of the items in the genres, while correlating with the item names;
  means for calculating current buying prices of the items based on the purchase prices, the genres of the items and the ranks of the items in the genres;
  means for retrieving a first item name of a first item which correlated with a first customer name belonging to the first customer in the purchase information, selecting a first genre in which the first customer most frequently purchased according to a plurality of purchase information correlated with the first customer name, and selecting a second item name of a second item which is most highly ranked in the first genre;
  means for sending an electronic mail, including the calculated current buying price of the first item and the first item name, and the calculated current buying price of the second item and the second item name, to the electronic mail address of the first customer, when the second item name in the purchase information correlated with the first customer is different than the first item name; and
  means for sending an electronic mail, including the calculated current buying price of the first item and the first item name, but excluding the calculated current buying price of the second item and the second item name, to the electronic mail address of the first customer, when the second item name in the purchase information correlated with the first customer is the same as the first item name.

11. A computer-readable recording medium recording a computer program for operating a server computer, which is connected to a client computer used by a first customer via a network wherein the computer program causes the server computer to execute:
  registering item names, purchase information including purchase prices and electronic mail addresses of customers who purchased items, while correlating with customer names;
  registering genres of the items and ranks of the items in the genres, while correlating with the item names;
  calculating current buying prices of the items based on the purchase prices, the genres of the items and the ranks of the items in the genres;
  retrieving a first item name of a first item which correlated with a first customer name belonging to the first customer in the purchase information;
  selecting a first genre in which the first customer most frequently purchased according to a plurality of purchase information correlated with the first customer name;
  selecting a second item name of a second item which is most highly ranked in the first genre;
  sending an electronic mail, including the calculated current buying price of the first item and the first item name, and the calculated current buying price of the second item and the second item name, to the electronic mail address of the first customer, when the second item name in the purchase information correlated with the first customer is different than the first item name; and
  sending an electronic mail, including the calculated current buying price of the first item and the first item name, but excluding the calculated current buying price of the second item and the second item name, to the electronic mail address of the first customer, when the second item name in the purchase information correlated with the first customer is the same as the first item name.

12. An apparatus comprising: a processing unit and a data storage unit coupled to the processing unit, the processing unit and the data storage unit configured to perform a method comprising:
  storing item names, purchase information including purchase prices and electronic mail addresses of customers who purchased items, while correlating with customer names;
  registering genres of the items and ranks of the items in the genres, while correlating with the item names;
  calculating current buying prices of the items based on the purchase prices, the genres of the items and the ranks of the items in the genres;
  retrieving a first item name of a first item which correlated with a first customer name belonging to a first customer in the purchase information;
  selecting a first genre in which the first customer most frequently purchased according to a plurality of purchase information correlated with the first customer name;
  selecting a second item name of a second item which is most highly ranked in the first genre;
  sending an electronic mail, including the calculated current buying price of the first item and the first item name, and the calculated current buying price of the second item and the second item name, to the electronic mail address of the first customer, when the second item name in the purchase information correlated with the first customer is different than the first item name; and
  sending an electronic mail, including the calculated current buying price of the first item and the first item name, but excluding the calculated current buying price of the second item and the second item name, to the electronic mail address of the first customer, when the second item name in the purchase information correlated with the first customer is the same as the first item name.

* * * * *